Feb. 21, 1950  F. L. RUPLEY  2,498,136
HARDNESS TESTER
Filed Nov. 14, 1947  4 Sheets-Sheet 1
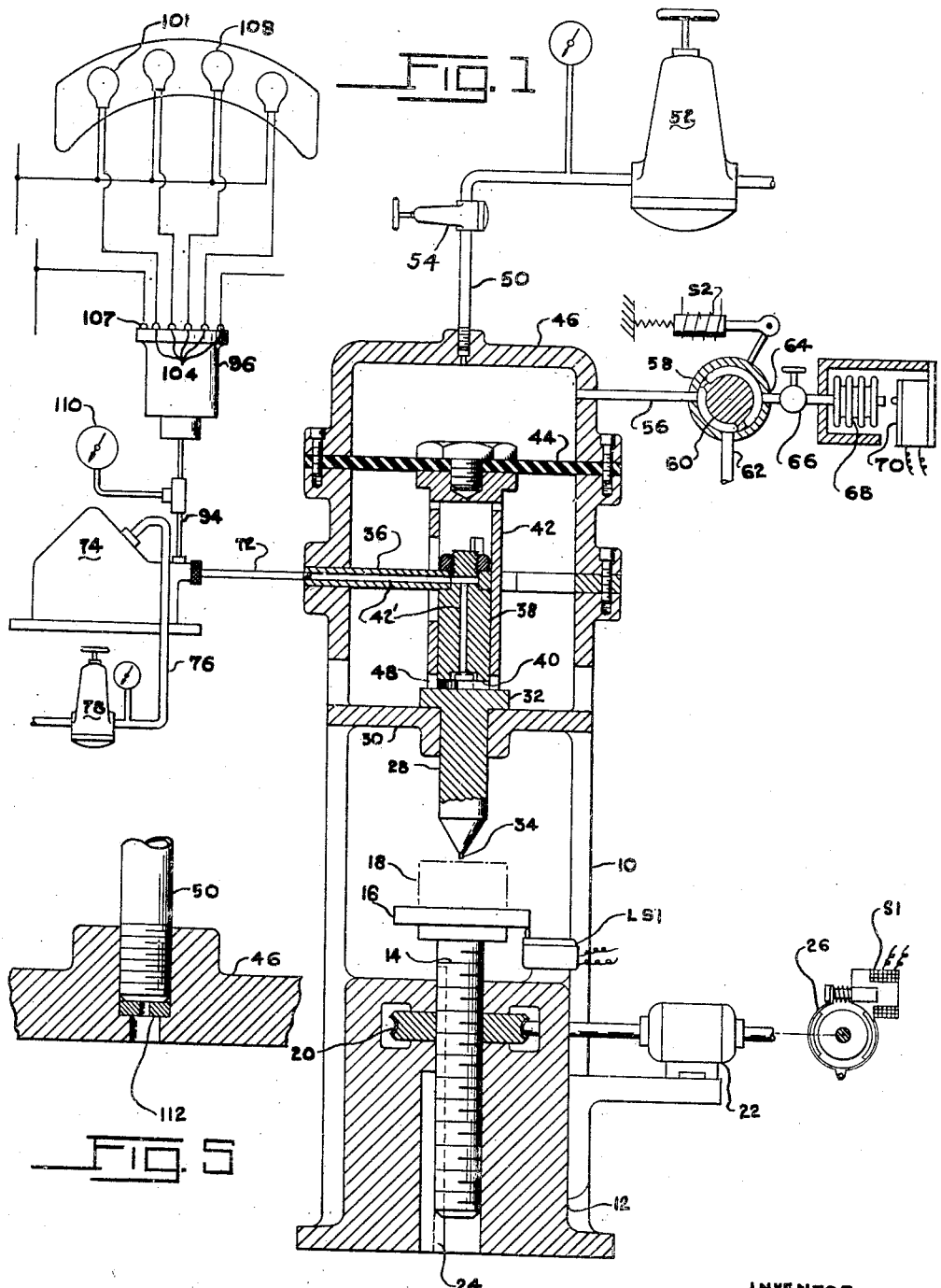
INVENTOR
FREDERICK L. RUPLEY
BY
Toulmin & Toulmin
ATTORNEYS Feb. 21, 1950        F. L. RUPLEY        2,498,136
HARDNESS TESTER
Filed Nov. 14, 1947        4 Sheets-Sheet 2
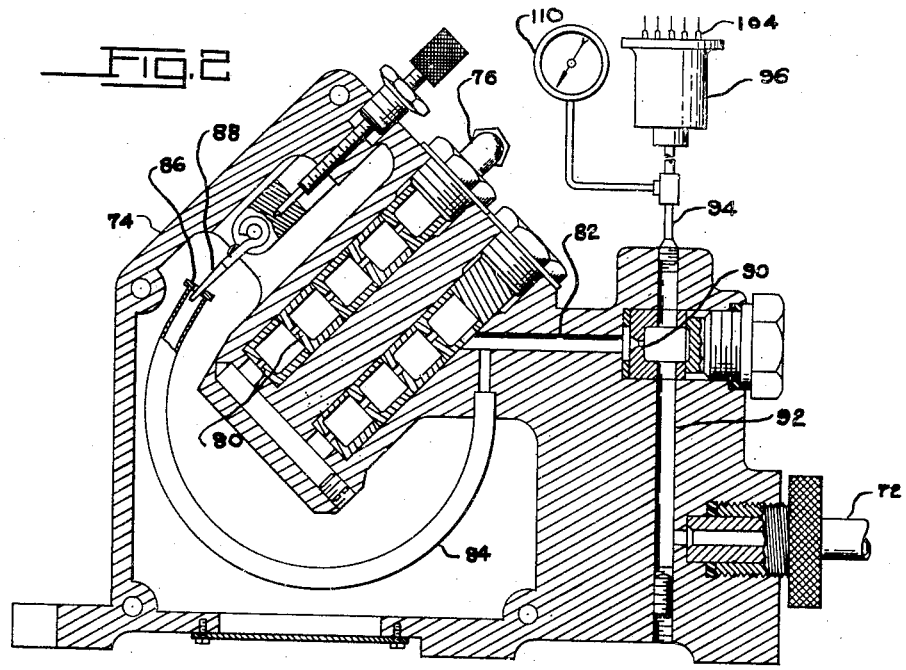
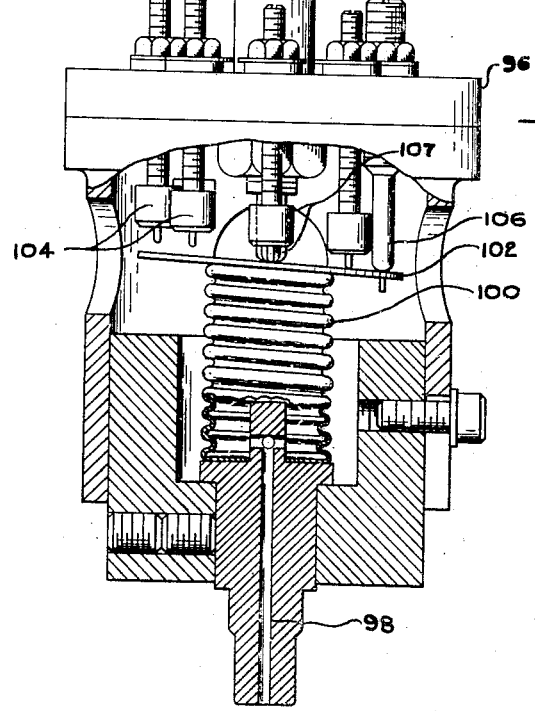
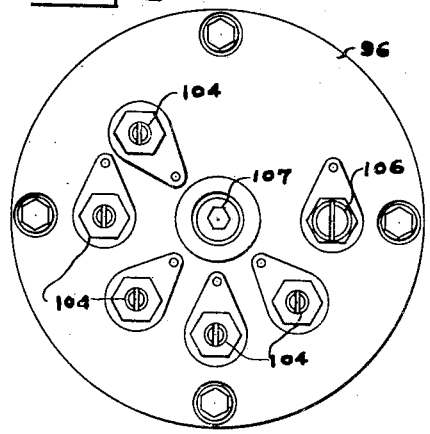
INVENTOR
FREDERICK L. RUPLEY
BY
Toulmin & Toulmin
ATTORNEYS

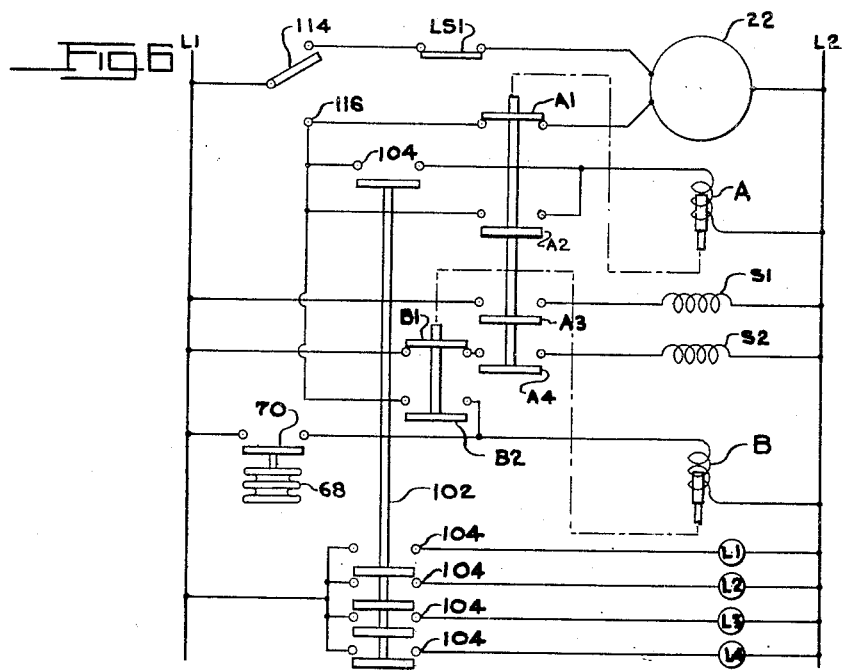
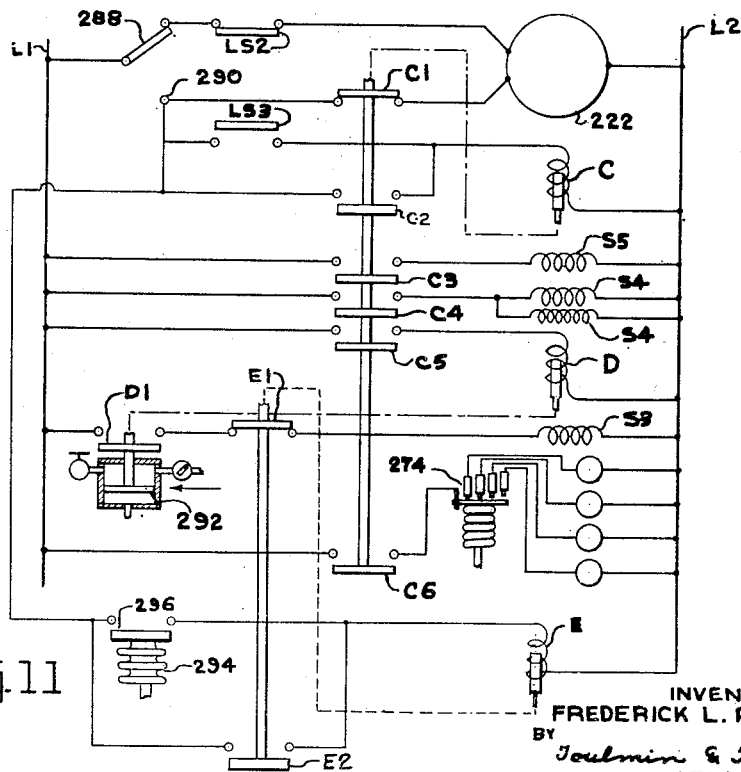

Feb. 21, 1950 F. L. RUPLEY 2,498,136
HARDNESS TESTER
Filed Nov. 14, 1947 4 Sheets-Sheet 4
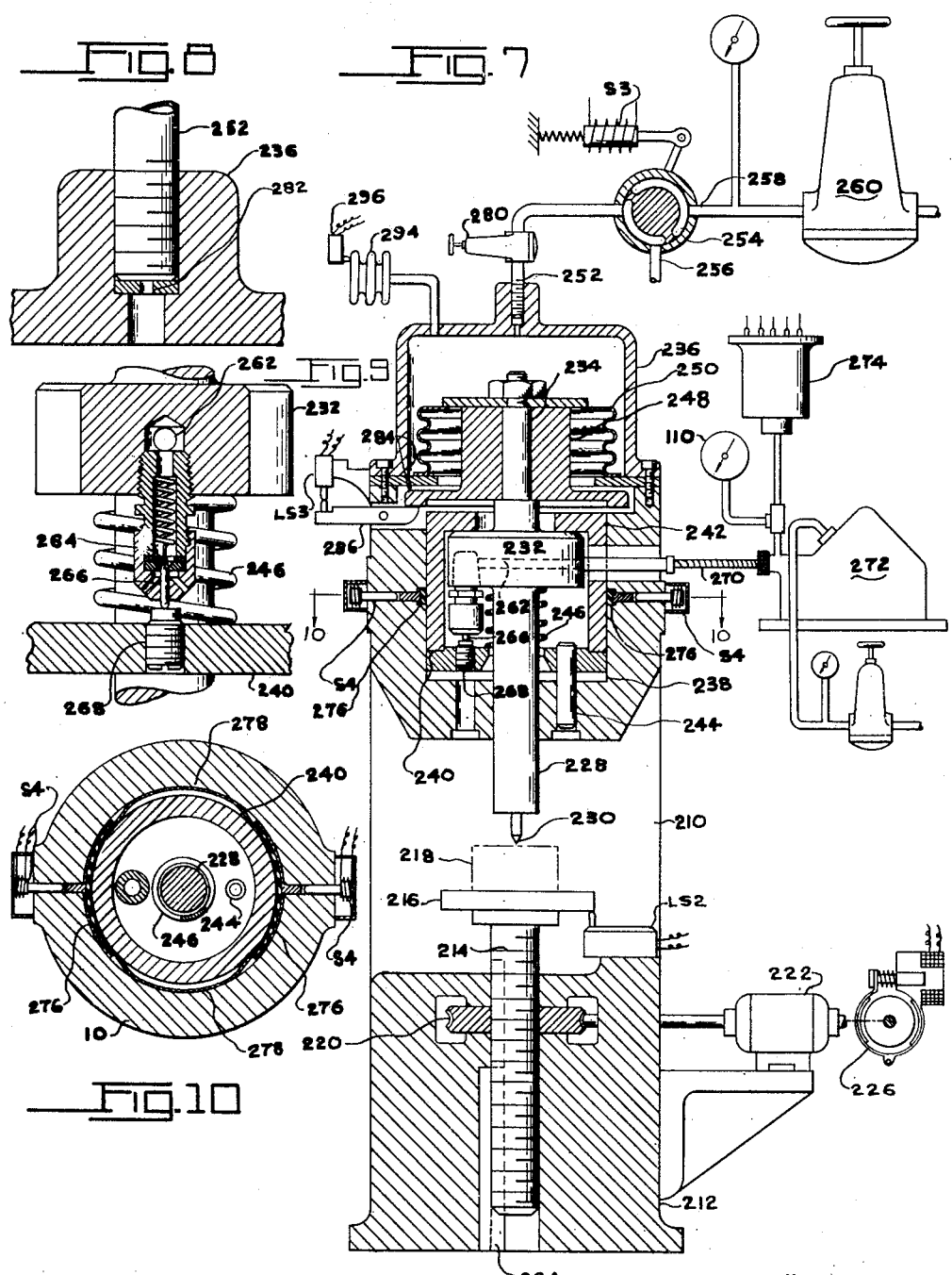
INVENTOR
FREDERICK L. RUPLEY
BY
Toulmin & Toulmin
ATTORNYS Patented Feb. 21, 1950

2,498,136

UNITED STATES PATENT OFFICE 2,498,136

HARDNESS TESTER

Frederick L. Rupley, Cincinnati, Ohio, assignor to Merz Engineering Co., Indianapolis, Ind., a corporation of Indiana Application November 14, 1947, Serial No. 785,838

12 Claims. (Cl. 73—83)

This invention relates to hardness testing apparatus, and particularly to an automatically operable device for determining the hardness of workpieces placed therein.

In modern industry and with mass production methods it is desirable wherever possible to give one hundred percent inspection on the workpieces at several points during their process of manufacture.

A complete inspection of this type involves not only the careful measurement of all of the critical dimensions of the workpiece but also a measure of the hardness of the workpiece, especially those which are heat treated.

Heretofore it has been possible to make a complete inspection of a batch of workpieces as regards size and form, but it has not been possible to check all of the pieces for hardness due to the limitations of the hardness testing devices available for this purpose.

The particular limitation of such devices that operated to prevent complete inspection of quantities of workpieces was the requirement for manual operation and a very slow operating cycle.

Thus, it has been customary heretofore only to test a predetermined few of a group of workpieces for the hardness thereof and to assign the average value of the hardness of that group to the entire batch.

It will be apparent that in the case of workpieces such as wrist pins, crank shafts, piston rings, gears, shafts, and other components of engines and similar products, such inspection for hardness is not as complete as could be desired.

In most of the work members mentioned above it is essential that the hardness be maintained within relatively close limits and the only good way of determining this is to inspect each workpiece individually.

Accordingly, the primary object of the present invention is to provide an improved testing device for testing the hardness of workpieces which has a sufficiently rapid overall cycle that it will be practical to give one hundred percent inspection to workpieces in quantity.

It is another object to provide a hardness testing device which will operate substantially on a full automatic cycle thereby greatly increasing the speed of operation.

A still further object is to provide a hardness testing machine which has a rapid and automatic cycle and which gives accurate results.

A still further object is the provision of a rapidly operating hardness testing machine which is readily adjustable to any of the several standard ranges within which hardness testing machines work.

Hardness testing machines which are widely used today are generally of the Brinell or Rockwell types. In both of these types the hardness of the workpiece is determined by pressing a steel ball or a shaped diamond point into the workpiece under a predetermined load.

In the case of the Brinell machine the load applied is three kilograms for a period of 30 seconds and the indentation made by the test point is measured by a microscope.

In the case of the Rockwell type machine any of several loads ranging from 15 to 150 kilograms may be applied in a predetermined manner and for a predetermined period and the penetration of the work by the test point is visually indicated on a dial.

Due to the fact that the last mentioned machine includes an indicating pointer for revealing the hardness of the test piece, the Rockwell type machine is to be favored where rapid readings are desired.

In the use of both of the testing machines described above, certain manual operations must be carried out, including adjusting the workpiece into engagement with the point, applying a predetermined initial load to the point, and thereafter applying and relaxing the test load on the gauging point.

Further, in the case of the Brinell machine it is necessary to measure the indentation very carefully by a microscope.

Thus, both these types of instruments are relatively slow in operation and do not fulfill the need for a hardness testing device sufficiently rapid in operation to process great quantities of workpieces in a short time.

The exact nature of this invention and the further objects and advantages will become more apparent upon reference to the following description taken in connection with the accompanying drawings in which:

Figure 1 is a sectional view taken through one form of machine constructed according to this invention;

Figure 2 is a sectional view through an air gauging mechanism associated with the testing machine of Figure 1;

Figure 3 is a vertical section through an electric switch connected with the gauging mechanism of Figure 2;

Figure 4 is a plan view looking down on the switch of Figure 3 and showing the arrangement of contacts therein;

Figure 5 is a fragmentary view showing a modified construction of a part of the device shown in Figure 1;

Figure 6 is a diagram of the electrical control circuit associated with the testing device shown in Figures 1 through 5;

Figure 7 is a view similar to Figure 1 but showing a somewhat modified arrangement of the machine;

Figure 8 is a fragmentary view showing a modified construction of a part of the apparatus of Figure 7;

Figure 9 is a sectional view taken through a gauging orifice associated with the air gauge mechanism connected with Figure 7;

Figure 10 is a plan view indicated by the line 10—10 on Figure 7; and

Figure 11 is an electrical diagram of the control circuit for controlling the apparatus shown in Figures 7 through 10.

Referring to the drawing, the testing machine illustrated in Figures 1 through 5 comprise a frame 10 having a base part 12 which is vertically bored for reciprocably receiving a screw 14. The screw 14 mounts an anvil 16 on its upper end for receiving a workpiece 18 which is to be tested.

Vertical movements of the screw in the base 12 are accomplished by a worm gear 20 which is adapted for being driven in either of two directions of rotation by a drive motor 22. Rotation of the screw in the base is prevented by a keyway extending along the screw which is engaged by a feather key 24. For the purpose of positively locking the screw in any position of elevation, the shaft of the motor 22 may mount a brake mechanism indicated at 26 and which includes a solenoid S1 which is energized for setting the brake.

Positioned above the anvil 16 and preferably in axial alignment with screw 14 is a gauging member 28 which may extend through a wall 30 of the frame and which is normally supported thereon by the enlarged upper end 32 of the said member. The lower end of the member 28 carries a gauging point indicated at 34 and which may be a hardened ball of any predetermined diameter or which may be a shaped diamond point having the configuration which is customarily given to such test points.

The frame 10 of the machine has mounted therein a spider 36 above the upper end of the member 28 and supported on and extending downwardly from the said spider is a cylindrical plug 38 which has a flat end surface 40 somewhat spaced above the upper end of the gauging member 28 when the latter is in the position shown in Figure 1.

A channel 42' extends through one leg of the spider 36 and downwardly through the plug 38 so that the lower end of the said plug and the upper end of the member 28 form a variable orifice for restricting fluid flow through the said channel.

Surrounding the plug 38 and being slotted to permit the legs of the spider 36 to extend therethrough is a sleeve member 42 which is secured at its upper end to a flexible diaphragm 44 that has its periphery overlying the upper end of the frame 10 and clamped between the said frame and a dome part 46. The dome part 46 and the diaphragm 44 thus form a fluid tight chamber for a pump which will become apparent hereinafter.

The lower end of the member 42 has a plurality of spaced legs thereon as at 48 which engage the upper surface of the member 28. Vertical movements of the member 28 are thus accompanied by vertical movements of the member 42, but the spaces between the legs 48 prevent the said sleeve from influencing the variable orifice formed by the plug 38 and the member 28.

Connected with the dome 46 is a conduit 50 which leads to the discharge side of a pressure regulator 52. Fluid under a predetermined pressure is thereby continuously delivered to the chamber by the conduit 50.

Should it be desirable to control the rate of fluid supply to the chamber, a throttle valve as at 54 may be included in the conduit 50.

A second conduit 56 is also connected with the chamber and leads to a valve 58 having therein a movable valve member 60. A first port 62 in the said valve opens to the atmosphere while a second port 64 is connected through a throttle valve 66 with a pressure switch comprising the bellows 68 and the switch mechanism 70. The valve member 60 is normally positioned to connect the conduit 56 with the exhaust port 62 but is movable by energization of a solenoid S2 into position to connect the conduit 56 with the port 64.

Connected with the channel 42 in the spider 36 is a conduit 72 which leads to a gauging mechanism generally indicated at 74 and better seen in Figure 2.

In Figure 2 the mechanism 74 will be seen to comprise an inlet conduit 76 to which a supply of fluid under closely controlled pressure is supplied as by the pressure regulator indicated at 78 in Figure 1.

The fluid supply entering the gauging mechanism from the conduit 76 passes through a plurality of throttling members 80 and is then delivered to a chamber 82 to which is connected a Bourdon tube 84. The free end of the Bourdon tube has a port 86 therein adapted for being variably restricted by the tapered gauging member 88.

It will be evident that changes in pressure in the chamber 82 will be accompanied by relative movements between the free end of the Bourdon tube and the member 88 such that the escape of fluid from the said chamber will be inversely proportional to the pressure therein. This operates to control the pressure in the chamber 82 within very close limits.

The chamber 82 is also connected through an accurately sized master orifice 90 with a channel 92 leading on one hand to the conduit 72 and on the other hand to a conduit 94 extending to the inlet of an electric switch mechanism generally indicated at 96.

The switch mechanism at 96 is better illustrated in Figures 3 and 4 wherein it will be seen that the pressure fluid supplied to the inlet 98 of the said switch is supplied to an expansible pressure responsive element such as the bellows 100.

The bellows 100 carries on its free end a plate 102 of electrically conductive material and spaced from the said plate at varying distances are a plurality of adjustable contact members 104.

Another member 106 bears against the plate at one point around the periphery thereof and forms a pivot point about which the plate oscillates in making successive engagement with the several contacts 104 as the bellows 100 expands due to increasing pressure therein. Also, a central contact point 107 is spring pressed against the center of the plate and remains in continuous contact therewith.

As will be seen in Figure 1 four of the contact members 104 are connected with the lights 108 of a bank of lights so that the said lights are successively illuminated as the plate 102 is actuated by expansion of the bellows 100.

For giving an additional indication as to the pressure standing within the conduit 94 an indicating pressure gauge 110 may be connected therewith as shown in Figures 1 and 2.

The gauging mechanism generally indicated at 74 is more completely shown and described in my co-pending application, Serial No. 653,353, filed March 9, 1946, while the switching mechanism generally indicated at 96 is more fully shown and described in my copending application Serial No. 716,493, filed December 16, 1946, both of the said applications being assigned to the same assignee as the instant application.

The modification shown in Figures 1 through 4 operates as follows:

A workpiece 18 is placed on the anvil 16. The motor 22 is then energized to drive the screw 14 upwardly until the workpiece 18 engages the test point 34 on the member 28 and moves the said member upwardly. As the member moves upwardly it commences to restrict the flow of fluid from the channel 42 to the atmosphere and thus causes a pressure to build up in the channel 92 in the gauging mechanism. This increasing pressure is conveyed through the conduit 94 to the switch mechanism 96 and causes actuation of the contact plate 102 thereof.

When the last of the contacts 104 is engaged by the plate 102, the motor 22 is automatically de-energized to halt movement of the anvil and the valve 58 is automatically shifted to commence a build up of pressure within the dome 46 and above the diaphragm 44. This results in a predetermined downwardly thrust on the gauging member 28 which drives the test point 34 into the workpiece.

After a predetermined time, the valve 58 is returned to position to exhaust the dome 46 and to relax the load on the gauging member. At this time the restriction of the end of the channel 42' will be decreased so that the pressure in the channel 92 will be decreased and the plate 102 of the switch mechanism will occupy a new position wherein a different condition of contact thereof with the contact points 104 exists.

The exact positioning of the plate 102 relative to the points will be indicated by the lights 108. The hardness of the piece being measured will thus be indicated automatically and can be determined whether or not it comes within the required limits.

In certain instances it may be desirable to control the rate at which pressure is built up within the dome 46 and this may be accomplished either by adjustment of the valve 54 or by the inclusion of the throttling orifice 112 shown in Figure 5 as being placed between the conduit 50 and the dome 46.

The electrical circuit for controlling the operation of the device shown in Figure 1, and by means of which automatic operation thereof is obtained, is illustrated in Figure 6.

In Figure 6 the motor 22 is shown connected between the power lines L1 and L2 through a selector switch 114 by means of which the direction of rotation of the said motor is determined. When the switch is in its upper position the motor operates in a direction to move the screw 14 and anvil 16 downwardly.

At a predetermined position, the anvil 16 will engage and open a limit switch LS1 which will de-energize and halt the said motor. In its other position the switch 114 engages a contact 116 and energizes the motor to raise the screw and anvil upwardly.

As mentioned before upward movement of the anvil brings the workpiece against the end of the gauging member 28 and lifts it upwardly to restrict the discharge of fluid from the channel 42. This builds up a pressure in the switch which causes the plate 102 to move upwardly, thereby successively engaging the contacts 104. When the last of the contacts 104 is engaged, a relay coil A in series therewith is energized.

Energization of the relay coil A will open the blade A1 thereof to de-energize and halt the motor 22, will close the blade A2 thereof to provide a holding circuit for the said relay, will close the blade A3 to energize the brake solenoid S1, and will close the blade A4 to energize the solenoid S4 of the valve 58.

Inasmuch as energization of S2 will shift the valve 58 to connect the conduit 56 with the port 64, the pressure which builds up in the dome 46 is communicated to the bellows 68 associated with the switch 70. When this pressure has reached a value which will close the switch 70, a relay coil B is energized. Energization of B will open the blades B1 thereof to de-energize the valve solenoid S2 and will close the blades B2 thereof to provide a holding circuit for the said contactor.

Since the valve solenoid is now de-energized, the valve 58 returns to position to connect the conduit 56 with the exhaust port 62 and the pressure within the dome 46 is exhausted to atmosphere.

The load being removed from the gauging member 28, the said gauging member comes to rest with the fluid flow from the channel 42 being restricted a predetermined amount. As explained before this determines a predetermined position of the plate 102 which determines the number of the lights 108 which will be illuminated.

After the operator of the device has received the indication of the hardness of the workpiece, the switch 114 is shifted to its upper position to drive the motor 22 in a direction to retract the screw 14 and anvil 16.

At that time the holding circuits for the relay coils A and B will be interrupted and the electrical circuit will be in condition to commence a new cycle of operation.

It will be apparent that the testing of the workpiece is fully automatic as regards the positioning of the said piece against the test point, the applying of the load to the test point, the relaxing of the load from the test point, and the indication of the penetration of the test point into the workpiece.

Since these operations are all automatic it follows that workpieces may be tested in the machine in rapid order.

Further, should it be desired for the readings to compare with standard hardness tables, the application of the load to the test point, and the dwell of the load thereon can be carefully regulated so that the results obtained will be in complete conformity with standard practices. A result of this type is called a true hardness of the workpiece.

However, it may be satisfactory to determine what is known as the superficial hardness of the workpiece and, in general, it is not necessary for this reading to conform to any known schedules.

In the case of taking a reading of this type the application of the load to the test point and the removal thereof, can be accomplished in rapid order and a reading taken from a workpiece very quickly after it is placed in the machine. The results obtained from this type of test would be comparative and in many instances would be fully satisfactory inasmuch as they would reveal if the workpieces were uniform in their hardness characteristics.

Another form which the device of this invention may take is illustrated in Figures 7 through 10.

Referring to these figures the device shown therein comprises a frame part 210 having a base 212 within which is vertically slidable the screw 214 which supports the anvil 216 adapted for receiving the workpiece 218.

As in the case of the first modification the screw is adapted for being driven by a gear 220 which is connected with a motor 222 and rotation of the screw is prevented by a feather key 224.

Also, as in the case of the arrangement of Figure 1, the motor shaft mounts a brake 226 energizable for clamping the motor in position. Positioned above the anvil 216 is a gauging member 228 carrying a test point 230. The member 228 extends upwardly into the frame 210 and includes an enlarged part 232 and a reduced diameter part 234 extending upwardly into a dome 236.

The part of the frame surrounding the enlarged part 232 is in the form of a smooth cylindrical bore 238 and slidable therein is a sleeve 240 which is normally suspended from the part 232 by the overhanging flange 242.

A dowel pin 244 prevents rotation of the sleeve part 240 and a spring 246 normally urges the said sleeve into a predetermined position relative to the said enlarged part 232.

Carried on the upper end 234 of the gauging member is a weight 248 which is for the purpose of applying initial preload to the gauging point when it is engaged by the workpiece in order to secure good engagement therebetween.

Connected between the base of the dome 236 and the upper end of the weight 248 is a bellows 250 which forms with the said dome a chamber for receiving fluid pressure from a conduit 252 leading from a valve 254.

The valve 254 is adapted for normally interconnecting the conduit 252 with an exhaust port 256 and includes a solenoid S3 adapted when energized to move the valve to connect the conduit 252 with the conduit 258 leading from a pressure regulator 260.

As will be seen in Figure 9, the part 232 of the gauging member has a bore 262 extending therethrough which terminates in an orifice 264 adapted for being variably restricted by a tapered member 266. The tapered member 266 rides on the flat end of an adjustable screw 268 carried in the bottom wall of the sleeve 240 and thus relative movements between the sleeve and gauging member result in a change of restriction in the port 264.

The channel 262 communicates through a flexible connection 270 with a gauging mechanism 272 which is substantially identical with that shown and described in connection with the modification of Figure 1.

The gauging mechanism 272 also includes a switch mechanism 274 substantially identical with that shown and described in connection with the Figure 1 modification.

Surrounding the sleeve 240 and disposed in a recess in the bore 238 are clamping means comprising the locking shoes 276 which normally are urged away from the said sleeve by the springs 278 and which are movable into engagement with the said sleeve upon energization of the locking solenoids S4.

As in the case of the Figure 1 modification the rate of build up of pressure within the dome 236 may be regulated either by an adjustable throttle valve 280 in the conduit 252 or by an orifice 282 placed between the said conduit and the said chamber.

For predetermining the position of the gauging member 228 after it is engaged by the workpiece 218 the weight 248 has a flange 284 thereon against which a pivoted lever 286 bears. The other end of the lever 286 engages a limit switch LS3 and when the said weight moves upwardly a predetermined distance the limit switch LS3 is closed.

The electrical circuit for controlling the operation of the device shown in Figures 7 and 10 is illustrated in Figure 11 wherein it will be seen that the motor 222 is connected between the power lines L1 and L2 and that a switch 288 is provided which has an upper position for driving the motor to retract the screw and anvil downwardly, and a lower position for driving the motor to advance the screw and anvil upwardly.

The limit switch LS3 is connected between the contact 290 which is engaged by the switch 288 in its lower position and the contactor C. Closure of the limit switch LS3 thus energizes the contactor C. Energization of C opens the blade C1 thereof to de-energize the motor 222, closes the blade C2 thereof to provide a holding circuit for the said contactor, closes the blade C3 for energizing the actuating solenoid S5 of the brake 226, closes the blade C4 to energize the locking solenoids S4, closes the blade C5 to energize a contactor coil D, and closes a blade C6 to make the electric switch 274 effective.

Energization of S5 will clamp the motor 222 and therefore the screw 214 and anvil 216 rigidly in place. Energization of S4 will rigidly lock the sleeve 240 in place in the bore 238. Energization of D, after a predetermined time as determined by the dash pot 292, will close the blade D1 to energize the valve solenoid S3.

After a predetermined build up of pressure within the dome 236, the bellows 294 connected therewith will expand and close the switch 296. Closure of the switch 296 will energize the contactor E in series therewith and thus open the blade E1 to again de-energize the valve solenoid S3 and close the blade E2 to provide a holding circuit for the said contactor.

At this time the load on the gauging point is relaxed and an indication of the penetration of the test point into the workpiece can now be had upon observation of the bank of lights associated with the electric switch or by reference to the pressure gauge connected with the gauging mechanism.

When it is desired to reset the mechanism the switch 288 is returned to its upper position and the motor 222 is driven in a direction to retract the anvil downwardly.

As in the case of the control circuit shown in Figure 6, movement of the switch 288 to its upper position will clear the said circuit and prepare it for a new operating cycle.

In connection with the circuit in Figure 11 the time delay introduced by the dash pot 292 is for the purpose of insuring that the locking solenoids S4 and the brake solenoid S5 are fully actuated before there is any application of pressure to the gauging member. This insures accurate results.

It will be seen from the foregoing that the modification of Figure 2 is substantially identical with that of Figure 1 except for specific details in connection with the preloading of the test point, the application of the load thereto, and the measuring of the actual depth of penetration of the test point into the workpiece.

It will be understood that this invention is susceptible to modification in order to adapt it to different usages and conditions and, accordingly, it is desired to comprehend such modifications within this invention as may fall within the scope of the appended claims.

I claim:

1. In a hardness testing machine, a member having a test point, a gauging mechanism operable to indicate movements of said member, fluid operable means for thrusting said member in the direction of the point, an anvil spaced from said point, a motor to drive the anvil to carry a workpiece supported thereon to said point, means for actuating the motor to drive the anvil toward said point whereby work thereon will engage the point and move said member into a predetermined position as indicated by said gauging mechanism, and means responsive to the movement of said member into said position for halting said motor and for supplying pressure to said fluid operable means, said gauging means being operable thereafter to indicate the penetration of the work by the point.

2. In a hardness testing machine, a frame, a member movable in said frame and having a point on its lower end, fluid operable means for thrusting said member in the direction of its point, gauging mechanism associated with said frame and including a port positioned to be restricted by upward movement of said member, said gauging mechanism being adapted to develop pressures proportional to the restriction of said port, an electric switch connected to be responsive to said pressures and having a plurality of contacts for successive engagement through a range of increasing pressures, an anvil movable in said frame to carry a workpiece against said point, a motor selectively energizable to actuate said anvil, and means responsive to the closing of one of said contacts for de-energizing said motor and for bringing about a supply of pressure to said fluid operable means.

3. In a hardness testing machine, a frame, a member movable in said frame and having a point on its lower end, fluid operable means for thrusting said member in the direction of its point, gauging mechanism associated with said frame and including a port positioned to be restricted by upward movement of said member, said gauging mechanism being adapted to develop pressures proportional to the restriction of said port, an electric switch connected to be responsive to said pressures and having a plurality of contacts for successive engagement through a range of increasing pressures, an anvil movable in said frame to carry a workpiece against said point, a motor selectively energizable to actuate said anvil, and means responsive to the closing of the one of said contacts responsive to the highest pressure for de-energizing said motor and for bringing about a supply of pressure fluid to said fluid operable means.

4. In a hardness testing machine, a frame, a member movable in said frame and having a point on its lower end, gauging mechanism associated with said frame and including a port positioned to be restricted by upward movement of said member, said gauging mechanism being adapted to develop pressures proportional to the restriction of said port, an electric switch connected to be responsive to said pressures and having a plurality of contacts for successive engagement through a range of increasing pressures, an anvil movable in said frame to carry a workpiece against said point, a motor selectively energizable to actuate said anvil, means responsive to the closing of the one of said contacts responsive to the highest pressure for de-energizing said motor and for bringing about a supply of pressure fluid to said fluid operable means, and means responsive to a predetermined pressure developed in said fluid operable means for bringing about the exhausting thereof.

5. In a hardness testing machine, a frame, an anvil in said frame, a member in alignment with said anvil and having a test point, fluid operable means for thrusting said member in the direction of its point, a gauging mechanism responsive to movements of said member upwardly for generating increasing pressures, an electric switch comprising a plurality of contacts adapted for being successively engaged through a range of increasing pressures and connected to receive pressure from said gauge, means energizable for driving said anvil toward said member whereby a workpiece on said anvil will engage said point and move said member upwardly, means responsive to the closing of the one of said contacts in said electric switch responsive to the highest pressure for automatically clamping said anvil in position and for admitting pressure fluid to said fluid operable means, pressure responsive means responsive to a predetermined pressure in said fluid operable means for exhausting the same, and indicating means connected with said contacts for indicating the final relative position of said member and gauging mechanism.

6. In a hardness testing machine, a frame, an anvil movably supported in said frame, a member having a test point also mounted in said frame and in alignment with said anvil, gauging mechanism associated with said member and responsive to movements thereof for indicating the position of said member on said frame, means for driving said anvil toward said member to bring a workpiece carried by the anvil against said point, means for automatically halting movement of said anvil when said member has been moved by engagement of said workpiece with said point to a predetermined position as indicated by said gauging mechanism, fluid pressure means acting on said member to force said point into said workpiece, means for supplying pressure fluid to said fluid pressure means, means responsive to a predetermined pressure built up in said fluid pressure means for disconnecting fluid pressure from said fluid pressure means, and means rendered effective upon the removal of pressure from said fluid pressure means to withdraw said point from the workpiece.

7. In a hardness testing machine, a frame, a weighted member in said frame having a test point on its lower end, a part suspended from said member and movable upwardly relative thereto, gauging mechanism carried partly by said member and partly by said part for indicating the relative movement therebetween, an anvil in said frame spaced beneath the point end of said member, power means for driving said anvil toward said member to bring a workpiece on the anvil against said point and to move said member and part a predetermined distance upwardly, means automatically operable for halting movement of said anvil upon a predetermined upward movement of said member and part and for clamping said part against said downward movement, and means for applying a predetermined downward thrust on said member whereby the penetration of the point into the work will be indicated by said gauging mechanism including fluid pressure means for thrusting said member operable upon the clamping of said part against downward movement.

8. In a hardness testing machine, a frame, a weighted member in said frame having a test point on its lower end, a part suspended from said member and movable upwardly relative thereto, gauging mechanism carried partly by said member and partly by said part for indicating the relative movement therebetween, an anvil in said frame spaced beneath the point end of said member, power means for driving said anvil toward said member to bring a workpiece on the anvil against said point and to move said member and part a predetermined distance upwardly, means automatically operable for halting movement of said anvil upon a predetermined upward movement of said member and part and for clamping said part against said downward movement, and means for applying a predetermined downward thrust on said member whereby the penetration of the point into the work will be indicated by said gauging mechansim including fluid pressure means for thrusting said member operable upon the clamping of said part against downward movement 9. In a hardness tester, a frame, an anvil vertically movable in said frame, a motor energizable for moving said anvil, a member having a test point on its lower end and movable in said frame above said anvil, a part carried by said member, fluid operable means for thrusting said member downwardly, means for energizing said motor, means responsive to a predetermined upward movement of said member on said frame for deenergizing said motor to halt said anvil and for clamping said part fixedly at a predetermined position to said frame, means for supplying pressure fluid on said fluid operable means to drive said member downwardly, and a pneumatic gauging mechanism carried partly on said member and partly on said part and operable by the relative position of said member and part, for indicating the extent of penetration of the test point of said member into the work.

10. In a hardness testing machine, a frame, an anvil vertically movable in said frame, a motor energizable for moving said anvil, a member having a test point on its lower end and vertically movable in said frame above said anvil, a part suspended on said member but movable upwardly relative thereto, fluid operable means for thrusting said member downwardly, control means operable automatically for energizing said motor to elevate said anvil until the work carried thereby engages said point and lifts said member and part to a predetermined position on said frame, means for halting further movement of said anvil when said predetermined position is reached, means for clamping said part fixedly to said frame in said predetermined position, means rendered operative by the clamping of said part to apply pressure fluid to said fluid operable means, and gauging mechanism carried by said member and part and responsive to relative position of said member and part for indicating the extent of penetration of said point into a workpiece on said anvil.

11. In a hardness testing machine, a frame, a weighted member in said frame having a test point on the lower end thereof, a sleeve carried by said weighted member and movable relative thereto, gauging means carried by said sleeve and weighted member for automatically indicating the relative position of said sleeve and weighted member, an anvil positioned beneath the point end of said weighted member, means for driving said anvil to bring a workpiece thereon against the point end of said weighted member and to move said weighted member and sleeve to a predetermined position on said frame, means for locking said sleeve to said frame in said position, and means to thrust said weighted member toward said workpiece to force said point end into the workpiece to cause a relative repositioning of said sleeve and weighted member to actuate said gauging mechanism to indicate the penetration of the point end of the said member into said work.

12. In a hardness testing machine, a frame, a weighted member in said frame having a test point on its lower end, a sleeve suspended from said member and movable upwardly relative thereto, gauging mechanism carried partly by said weighted member and partly by said sleeve for indicating the relative position of said weighted member and sleeve, an anvil movably mounted on said frame spaced beneath the test point of said weighted member, power means for moving said anvil relative to said weighted member and test point to bring a workpiece on the anvil against said test point and to move said weighted member and sleeve through said point to a predetermined position on said frame, means automatically operable for halting movement of said anvil upon movement of said weighted member and sleeve to said predetermined position and for clamping said sleeve to said frame, and means for applying a predetermined downward thrust on said weighted member to cause penetration of the test point into the work so that relative movement of said weighted member and said sleeve will cause said gauging mechanism to indicate the hardness of said workpiece.

FREDERICK L. RUPLEY.

REFERENCES CITED

The following references are of record in the file of this patent:

UNITED STATES PATENTS

| Number | Name | Date |
| --- | --- | --- |
| 1,192,670 | Moore et al. | July 25, 1916 |
| 1,320,748 | Fisher | Nov. 4, 1919 |
| 1,564,197 | Brown | Dec. 8, 1925 |
| 1,762,497 | Wilson | June 10, 1930 |
| 2,009,314 | Gogan | July 23, 1935 |
| 2,099,216 | Nass | Nov. 16, 1937 |
| 2,277,199 | Baxendale | Mar. 24, 1942 |
| 2,323,925 | Markowardt | July 13, 1943 |
| 2,333,747 | Sklar | Nov. 9, 1943 |